(Model.)

C. HALL.
ANIMAL TRAP.

No. 429,521. Patented June 3, 1890.

WITNESSES:
F. L. Ourand
C. F. Chisholm

INVENTOR:
Charles Hall,
by Saius Daggert & Co.
Attorneys.

THE NORRIS PETERS CO., PHOTO-LITHO., WASHINGTON, D. C.

UNITED STATES PATENT OFFICE.

CHARLES HALL, OF SCRANTON, PENNSYLVANIA, ASSIGNOR OF ONE-HALF TO SAMUEL HOWARD, OF SAME PLACE.

ANIMAL-TRAP.

SPECIFICATION forming part of Letters Patent No. 429,521, dated June 3, 1890.

Application filed September 4, 1889. Serial No. 322,924. (Model.)

*To all whom it may concern:*

Be it known that I, CHARLES HALL, a citizen of the United States, and a resident of Scranton, in the county of Lackawanna and State of Pennsylvania, have invented certain new and useful Improvements in Animal-Traps; and I do hereby declare that the following is a full, clear, and exact description of the invention, which will enable others skilled in the art to which it appertains to make and use the same, reference being had to the accompanying drawings, which form a part of this specification, and in which—

Figure 1:
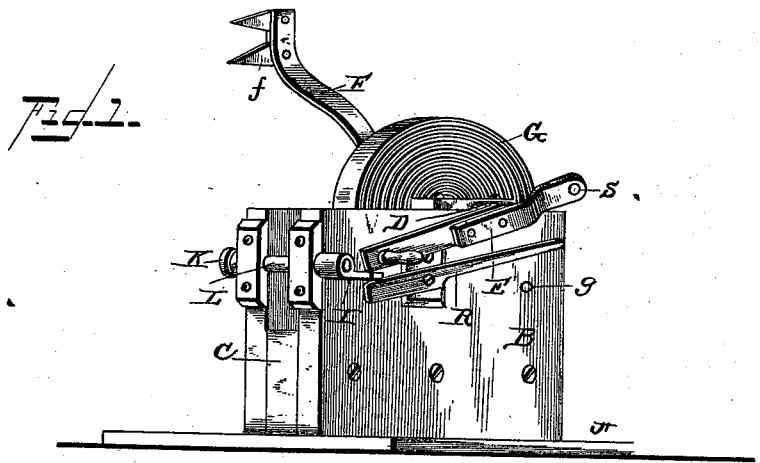
Figure 2:
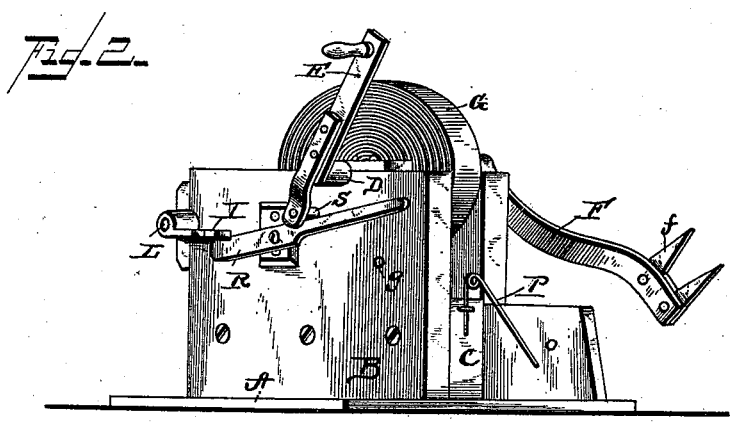
Figure 3:
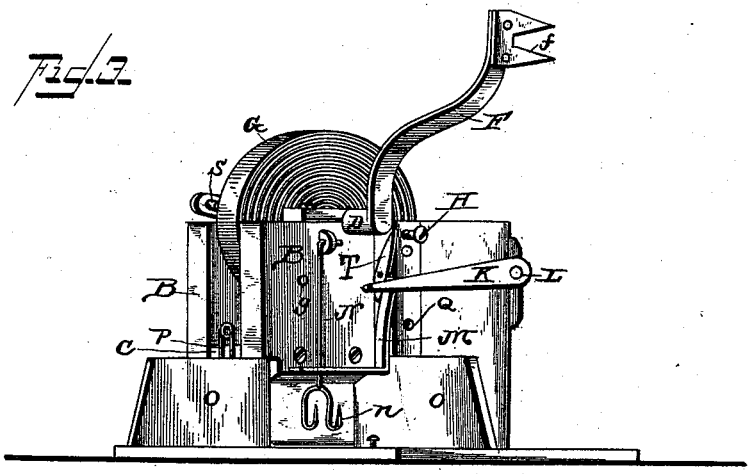

Figure 1 is a perspective view of my animal-trap ready set. Fig. 2 is a perspective view of the same, the trap having been sprung by an animal and the rotating claw having turned half of a revolution; and Fig. 3 is a like view illustrating the position of the parts at the instant the trap is sprung.

This invention relates to animal-traps, and has particular reference to that class of traps having a rotating claw, and has for its object to provide an improved device of this class in which the claw shall revolve in a vertical circle with sufficient force to insure the death of the animal and its removal from the vicinity of the trap, which shall reset itself again and again, and in which the operation is simple and the construction durable. I accomplish these objects by the device illustrated in the accompanying drawings, in which like letters of reference denote corresponding parts in all the figures.

The frame-work of the trap consists, essentially, of a base-board A and two parallel uprights B, said uprights having a block C resting between them for about half their height, to which they are fixed and by which they are rendered more firm. In suitable bearings at the top of these uprights B is placed a horizontal shaft D, having a handle-crank E fixed on one end and a claw-crank F on the other end, said claw-crank having teeth or claws $f$. A helical spring G has one end fixed to the shaft D, and its other end fastened to a rod $g$, inserted through the uprights B. When it is desired to wind up the spring G, the guard-pin H is removed and the handle-crank E turned. As it passes around it strikes the under side of the lug I, fixed on the shaft L, and turns said lug into a vertical position. At the same time the latch K, which is fixed to the opposite end of the shaft L, is also raised to a vertical position. When the spring has been wound sufficiently tight, the lug and latch are turned to a horizontal position and the guard-pin H replaced. The latch is normally retained in a horizontal position by the upper end of the pivoted trigger M. This also holds the lug I in a horizontal position, and the handle-crank strikes the upper side of this lug. Said handle-crank and the claw-crank are held in position as shown in Fig. 1.

The trigger M is bent at right angles, and through a hole in its horizontal arm loosely passes the hinged rod N, at the lower end of which are the bait-hooks $n$.

In tamping with the bait the animal will naturally pull the hooks $n$ outward. This will throw the upper end of the trigger in and release the latch K. The resiliency of the spring causes the handle-crank to press the lug I down, and at the same time the latch K, which, as has been shown, is fixed to the same shaft. The handle-crank slips past the lug I, both the handle-crank and the claw-crank revolve swiftly, and the claws $f$ strike the animal a deadly blow and sling it to a distance from the trap. A couple of strips O project one on each side of the bait-hooks, and form a sort of stall. The outer strip is hinged, so that it swings out when the rotating claw-crank strikes the animal, and is brought back to position by the action of a spring P, which is fixed to the block C. A pin Q limits the downward motion of the latch K.

In order that the claw-crank may make but one revolution at a time and the trap set itself, it is provided with certain attachments to co-operate with the parts already described. After the trap has been sprung, as shown in Fig. 3, the lug having been pressed down by the handle-crank and the latch K depressed with said lug I, it is necessary that these parts be brought back to the position they occupy in Fig. 1. A lever R, preferably made so that the two ends balance, is fulcrumed at the back of the trap, so that its short end shall rest under the lug I. A bar is fastened to the handle-crank and has an inwardly-projecting lug S. As the handle-crank revolves from the position shown in Fig. 2 to the position illustrated by Fig. 1, this lug depresses the long end of the lever, and raises the lug I and the latch K. As the handle-crank is revolving with considerable force when the lug S strikes the long end of the lever R, the action of said lever would raise the lug and latch too high were their upward motion not arrested by the latch striking the guard-pin H. In its upward motion the latch pushes in the upper end or the curved button-lever T, and the lower end of the button-lever throws the upper end of the pivoted trigger M out. Then, just before the handle-crank finishes its revolution, it strikes the lug I, and depresses said lug and latch K till the latch strikes the top of the trigger M, which has been thrown out to catch it, and thus the mechanism is brought to a stop.

As all parts of the mechanism are in the same position after each revolution of the handle-crank and claw-crank except that the spring has lost a certain amount of the tension, the trap will work again and again as successive animals tamper with the bait until the tension of the spring is relieved. Thus the trap may destroy a considerable number of animals at one winding and setting, and each animal that it kills is thrown at a sufficient distance from the trap so as not to prevent or obstruct the entrance and enticement of other animals.

Having thus described my invention, I claim and desire to secure by Letters Patent of the United States—

1. The combination, in a rotating claw-trap, of a horizontal shaft, a handle-crank and claw-crank fixed to said shaft, a helical spring adapted to operate said shaft, a pivoted trigger, bait-hook passing through a perforation in said trigger, strips forming a stall inclosing said bait-hook, one of said strips being hinged, a spring bearing against said hinged strip, a second shaft having a latch and lug fixed thereto, and a frame adapted to furnish bearings for said parts, all constructed and combined substantially as shown.

2. The combination, in a rotating claw-trap, of a base-board, parallel uprights, a central shaft journaled in bearings in said uprights, a handle-crank fixed to one end of said shaft, a bar secured to the lower end of said handle and provided with an inwardly-extending lug or projection, a claw-crank mounted upon the opposite end of the shaft, a transverse rod having its bearings in the uprights, a helical spring having one end secured to the shaft and the other end to the transverse rod, an end transverse shaft mounted in suitable bearings in the uprights carrying on one end a latch and on the opposite end a lug, a horizontally-pivoted lever constructed to engage the lug and to operate both the lug and latch, an angular pivoted trigger adapted to support the latch, a button-lever adapted to be operated by said latch and in turn to operate the trigger, and a hinged bait-hook having its lower end passing through the horizontal extension of the pivoted trap, substantially as set forth.

3. In a rotating claw-trap, the combination of a supporting-frame, a central shaft carrying on one end a revolving claw and on the opposite end a handle-crank, said crank being provided at its lower end with a bar having an inwardly-extending lug or projection, a helical spring adapted to operate said shaft, an angular pivoted trigger, a hinged bait-hook having its lower end passing through the horizontal extension of said trigger, an end transverse shaft carrying on one end a lug and on the opposite end a latch, a pin adapted to limit the downward movement of said latch, a lever pivoted at or near its center to one of the uprights of the frame and adapted to be operated by the inward lug or projection of the handle-crank, a button-lever adapted to be operated by the latch and to operate the trigger, and a removable guard-pin for limiting the upward movement of the latch, substantially as set forth.

In testimony that I claim the foregoing as my own I hereunto affix my signature in presence of two witnesses.

CHARLES HALL.

Witnesses:
 JOHN G. McASKIE,
 W. W. LATHROPE.